US005830377A

United States Patent [19]

Johnson

[11] Patent Number: 5,830,377

[45] Date of Patent: Nov. 3, 1998

[54] METHOD AND APPARATUS FOR PROVIDING A STABILIZED PLASMA ARC

[75] Inventor: Richard Franklin Johnson, Crystal, Minn.

[73] Assignee: United Defense, LP, Arlington, Va.

[21] Appl. No.: 868,610

[22] Filed: Jun. 4, 1997

[51] Int. Cl.$^{6}$ ..................................................... B23K 10/00

[52] U.S. Cl. ............... 219/121.36; 219/123; 219/121.59; 219/121.52; 102/202.5; 102/202.9

[58] Field of Search ......................... 219/121.48, 121.57, 219/121.54, 123, 121.52, 121.36, 121.59; 102/202.8, 472, 202.9, 202.11, 202.5

[56] References Cited

U.S. PATENT DOCUMENTS

| | | | |
|---|---|---|---|
| 5,211,142 | 5/1993 | Matthews et al. | 123/143 R |
| 5,227,577 | 7/1993 | Eich et al. | 102/102 |
| 5,444,208 | 8/1995 | Mortensen | 219/121.48 |
| 5,503,081 | 4/1996 | Lindblom et al. | 102/472 |
| 5,587,093 | 12/1996 | Aston | 219/121.48 |
| 5,640,843 | 6/1997 | Aston | 60/203.1 |

*Primary Examiner*—Mark H. Paschall
*Attorney, Agent, or Firm*—Douglas W. Rudy; Michael B. K. Lee

[57] ABSTRACT

This disclosure relates to a stabilized plasma injector device specifically adapted to incubate, shape and develop plasma under the influence of an adjustable electromagnetic field to provide ignition and further promote energy coupling between the plasma and a combustible mass. The device includes a pair of shaped coils one of which is evaporated to form the plasma and the other coil provides the electromagnetic force field to influence the characteristic arc symmetry and the energy coupling between the plasma and the surrounding combustible mass.

12 Claims, 6 Drawing Sheets

METHOD AND APPARATUS FOR PROVIDING A STABILIZED PLASMA ARC

FIELD OF THE INVENTION

This invention relates to a stabilized plasma arc injector device which comprises structures to control and stabilize plasma arcs particularly in electro-thermal chemical (ETC) applications and further to enhance energy coupling between the plasma arc and a propellant mass by consistent and balanced infusion of the plasma into segments of the propellant mass to thereby yield a predictable and efficient pressure profile.

SUMMARY OF THE INVENTION

The stabilized plasma arc injector device enables improvements in energy coupling between plasma and, for example, a combustible mass. Heretofore, plasma arc is isolated from the surrounding combustible mass to eliminate quenching, unpredictable detonation and unreliable plasma formation. Accordingly, prior practice involved the use of isolation devices such as a dielectric sheath for incubating the plasma. However, this structural arrangement and system invariably inhibits the burn rate and the plasma distribution in the combustible mass. Further, plasma arcs in such a system have been unstable and this problem is particularly significant in slender plasma arc columns having a cylindrical jet topology. Instability, kink, segmentation and interruptions in a plasma jet usually result in shorting, and inefficient burning thereby posing a risk of uncontrolled detonation.

The present invention overcomes these and other problems by applying a self-adjusting magnetic field to produce a stable or quasi-stable arc. The magnetic field is created by using coaxial helical coils through which a current path is established. A net axial magnetic field, for arresting and controlling the arc instability growth rates, can be produced by making one of the coaxial helical coils a return current path. Several configurations are possible relative to the input and return current which form an electromagnetic field. A generic configuration comprises a net electromagnetic field formed between two concentric solenoids or helical spirals. One of the coils is used as a fuse to create the plasma. Depending upon the location of the plasma relative to the solenoids and a combustible mass, the solenoids spiral could be arranged to effectuate the necessary stability for the plasma arc. The stabilized plasma arc is then directed into the combustible mass to promote efficient burning.

Specific advances, features and advantages of the present invention will become apparent upon examination of the following description and drawings dealing with several specific embodiments thereof.

DESCRIPTION OF THE PREFERRED EMBODIMENT

The present invention provides a significant improvement over the prior art because it enables the creation of stable plasma arcs and further enables intimate contact between the plasma arc and a combustible mass to promote efficient combustion. The present invention enables the plasma to be embedded in a significant volume of the combustible mass or propellant to interact with more propellant than in the case of plasma injectors of prior practice.

Near complete mixing, attachment and embedment of plasma with the combustible mass is primarily dependent on the hydrodynamic stability of the arc. If the hydrodynamic turbulence is attenuated, the plasma-combustible mass interaction is stabilized yielding high pressure and temperature per unit mass of propellant. Thus, one of the primary objectives of the present invention is the control and reduction of hydrodynamic instabilities. Prior art plasma injectors produce axial plasma columns that are susceptible to "sausage" or pinch instabilities This results in unpredictable detonation and unreliable pressure formation in the gun tube because the plasma is not controllably directed to invade the propellant mass. The present invention enables configurations wherein pinch or similar distortions are eliminated and enables the creation of stable slender arcs.

Figure 1:
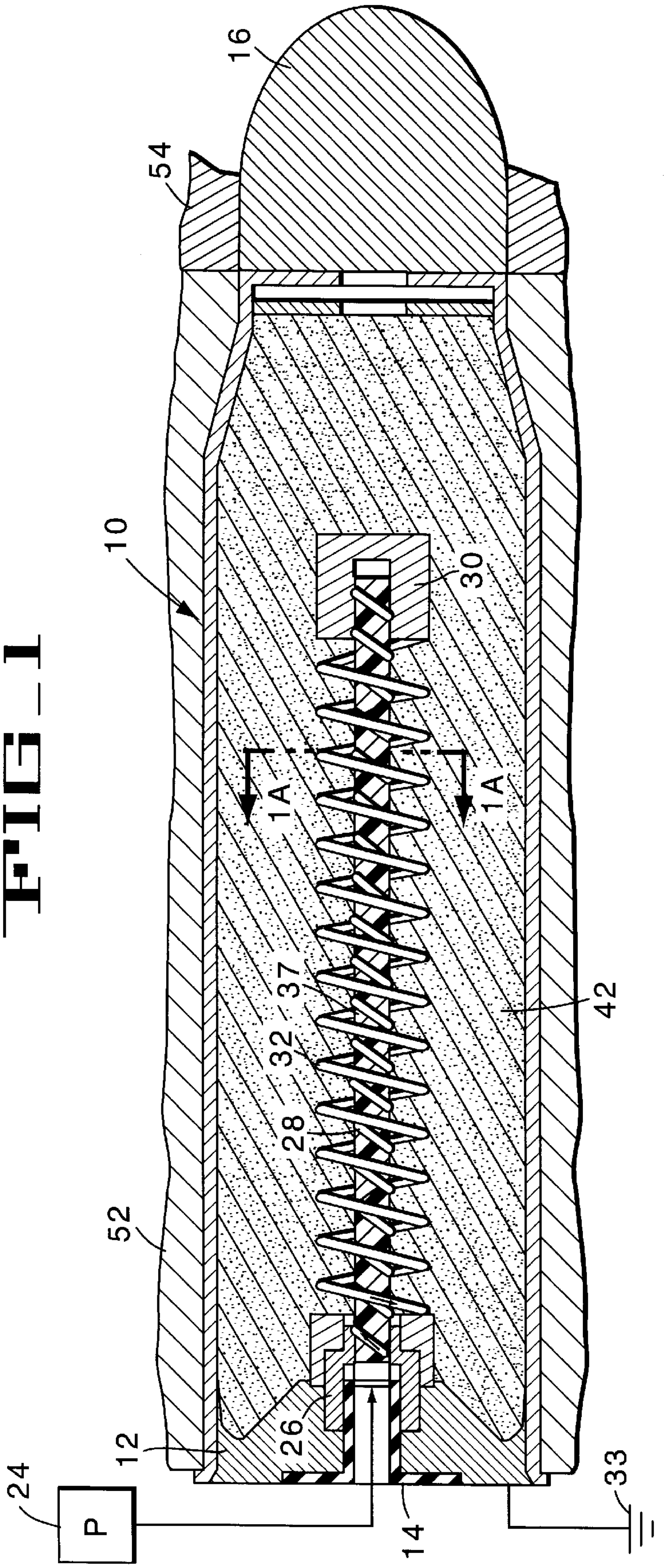
FIG. 1 is a central section of the stabilized plasma arc injector device in a cartridge to which a projectile is integrally attached.

Referring to FIG. 1, cartridge housing 10 includes a stub case 12 and insulator 14 (polyethylene, polyurethane or equivalent material) which are integrally attached to projectile 16. Power supply 24 is connected at the center of rim insulator 14 and is connected to a helical conductor 28 and anode 30. Return current path or helical conductor 32 also forms a helix which is attached to cathode 26 at the stub case 12 and to the ground return 33. Helical conductor 28 is mounted in a mandrel of insulating material 37 and the entire structure is cantilevered out into the combustible mass 42 which is contained in cartridge housing 10. As will be discussed in detail herein below, the present invention enables various configurations of the structural elements to achieve specific operational goals. The combustible mass 42 is contained in cartridge housing 10. Either helical conductor 28 or 32 may serve as the fusing material to ignite combustible mass 42 with the other helical conductor being insulated to prevent arc-over and other short circuiting problems. Further, insulator mandrel 37 is structured to be sufficiently rigid to support and cantilever into combustible mass 42 as well as withstand electromagnetic and mechanical stresses which occur during normal operation cycles. The configuration is disposed in a gun chamber 52 with projectile 16 engaged in gun tube 54.

Figure 1A:
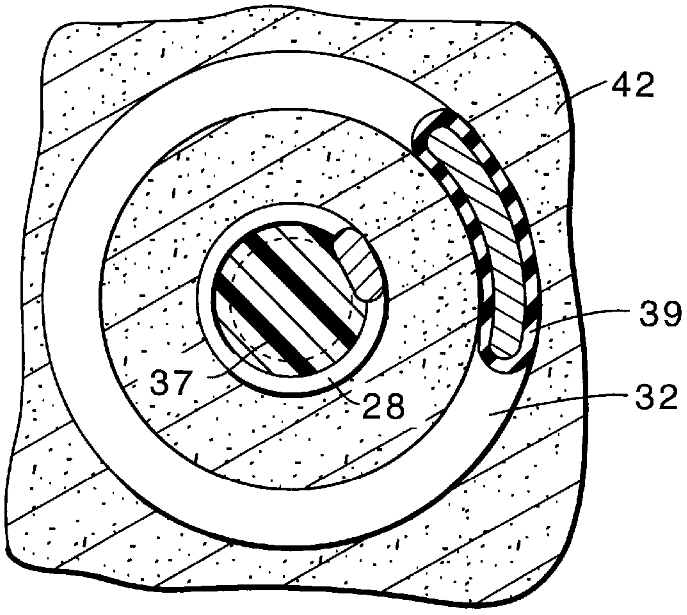
FIG. 1A is a section taken along line 1A—1A of FIG. 1.

FIG. 1A is a section taken along line 1A—1A of FIG. 1. Helical conductor 28 is mounted on mandrel 37. Mandrel 37 is a dielectric substance which is either consumable or non-consumable by the plasma arc. Helical conductor is concentric with mandrel 37 and conductor 28. Helical conductor 32 is insulated with insulation coating 39.

Figure 1B:
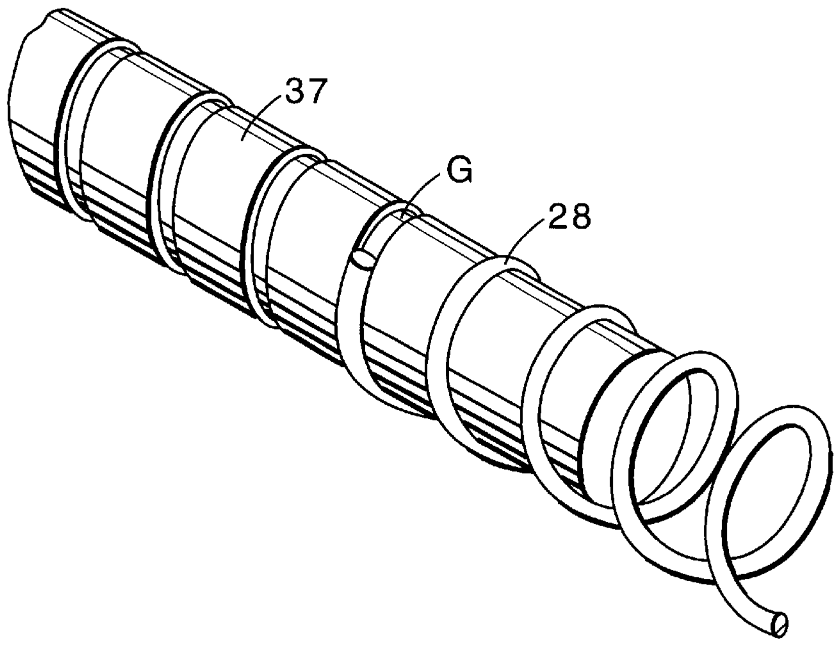
FIG. 1B is a perspective view showing grooves "G" on mandrel 37 with a portion of helical conductor 28 mounted in the grooves "G".

FIG. 1B is a perspective view showing helical conductor slidably and spirally mounted in the grooves "G" of mandrel 37.

Figure 2:
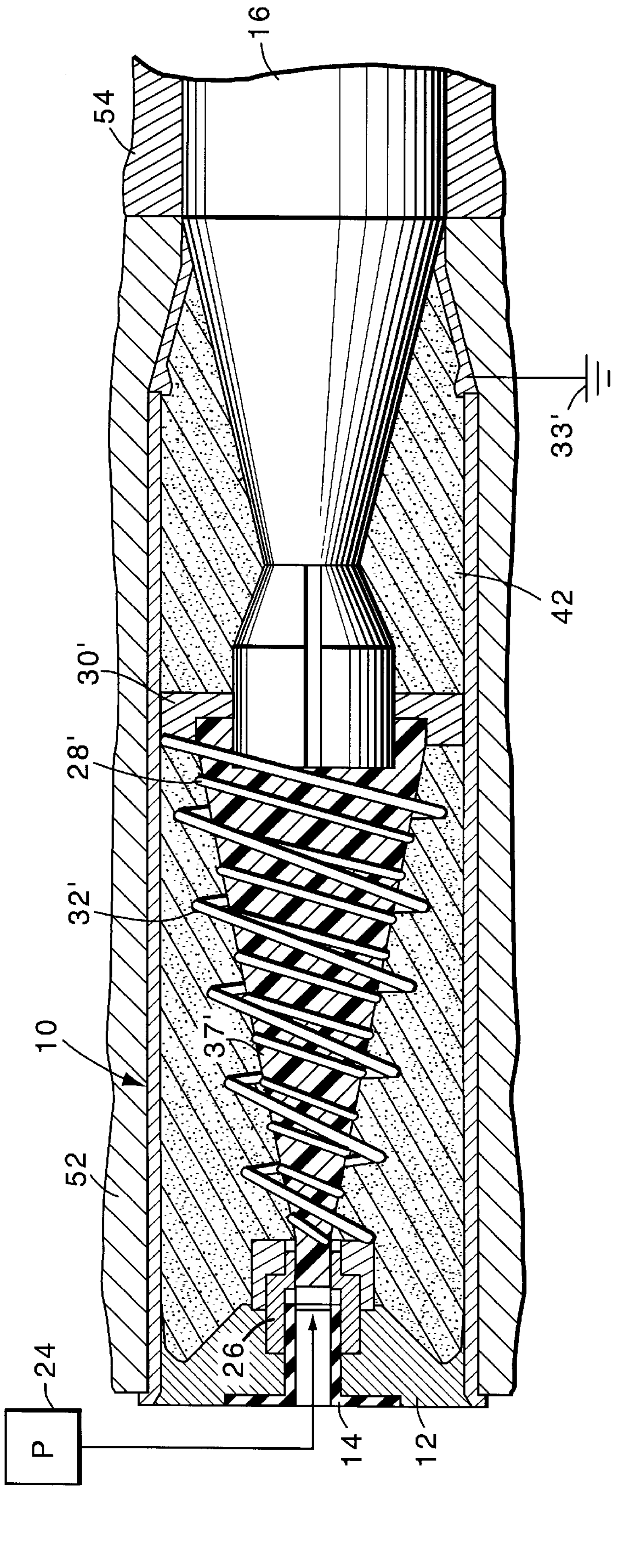
FIG. 2 is a central section of an alternate embodiment of the stabilized plasma arc injector device adapted for a cartridge which is integrated to a projectile with sabot and fins.

FIG. 2 is a configuration in which cartridge 10 comprising the stabilized arc injector device is disposed in gun chamber 52 with projectile 16 situated in gun tube 54. Current is injected from power connection 24 into helical conductor 28'. Helical conductor 28' is conically structured to accommodate projectile 16. Helical conductor 28' is connected to anode 30' which in turn is connected to helical conductor 32'.

Figure 3:
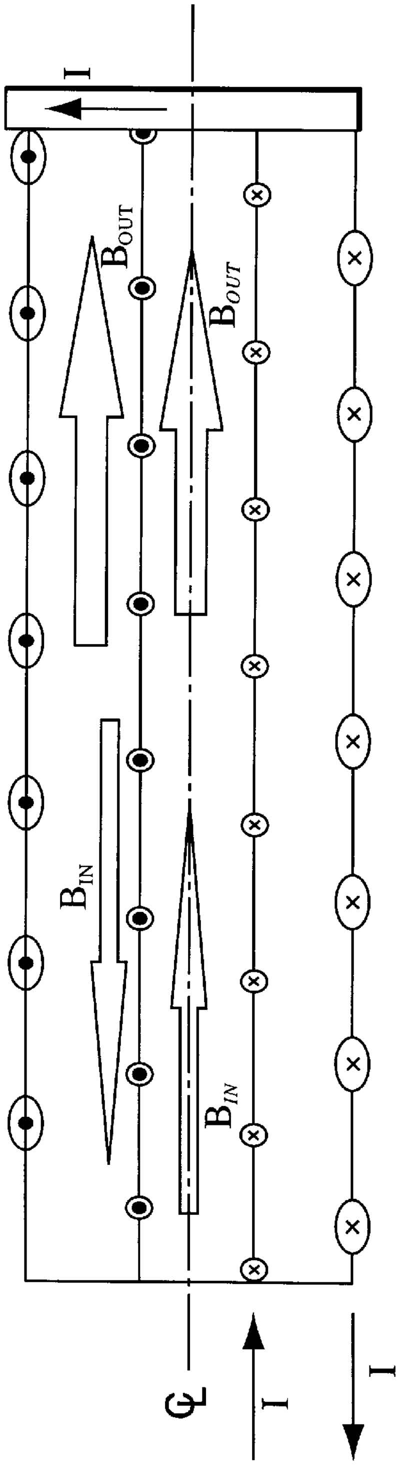
FIG. 3 is a central section showing magnetic field vectors and current density vectors developed between the coaxial helical coils of the stabilized plasma arc device for similar windings of the coils.

FIG. 3 shows directions of the magnetic fields produced by both helical conductor 28 and outer helical conductor 32. The relative winding of the helical conductors determines the magnetic field profile and consequently the symmetry of the arc produced. It is noteworthy that at the axis, the magnetic fields vectors are additive whereas in the region between the inner and outer conductors the magnetic field vectors oppose one another and are therefore deductive.

Figure 4:
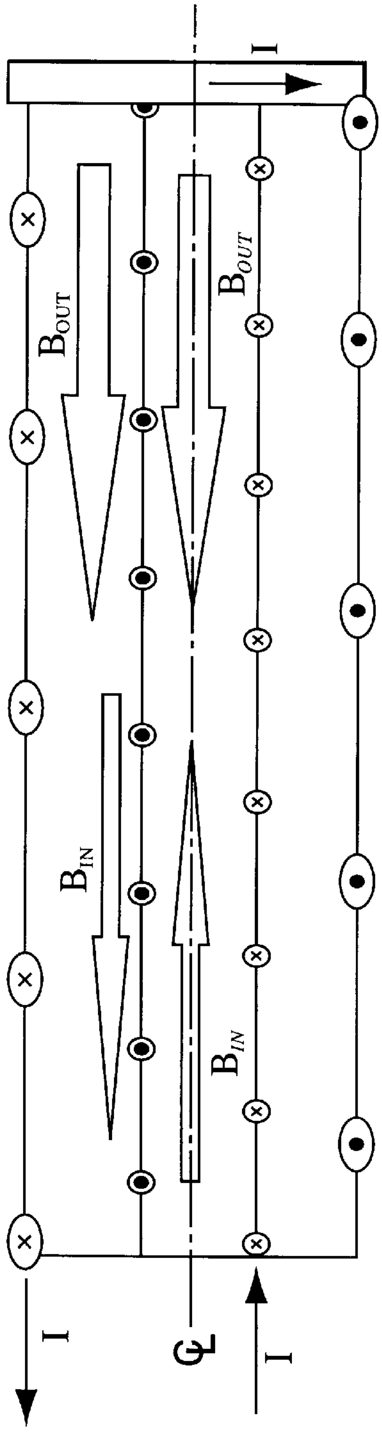
FIG. 4 is a central section showing magnetic field vectors and current density vectors developed between the coaxial helical coils of the stabilized plasma arc device for dissimilar windings of the coils.

FIG. 4 shows magnetic fields produced by the inner helical conductor 28 and outer helical conductor 32. In this case, the magnetic fields at the axis oppose one another. Further, in the region between the inner helical conductor 28 and the outer helical conductor 32 the magnetic fields complement each other. The current density vectors are indicated by the symbol "I".

Figure 5:
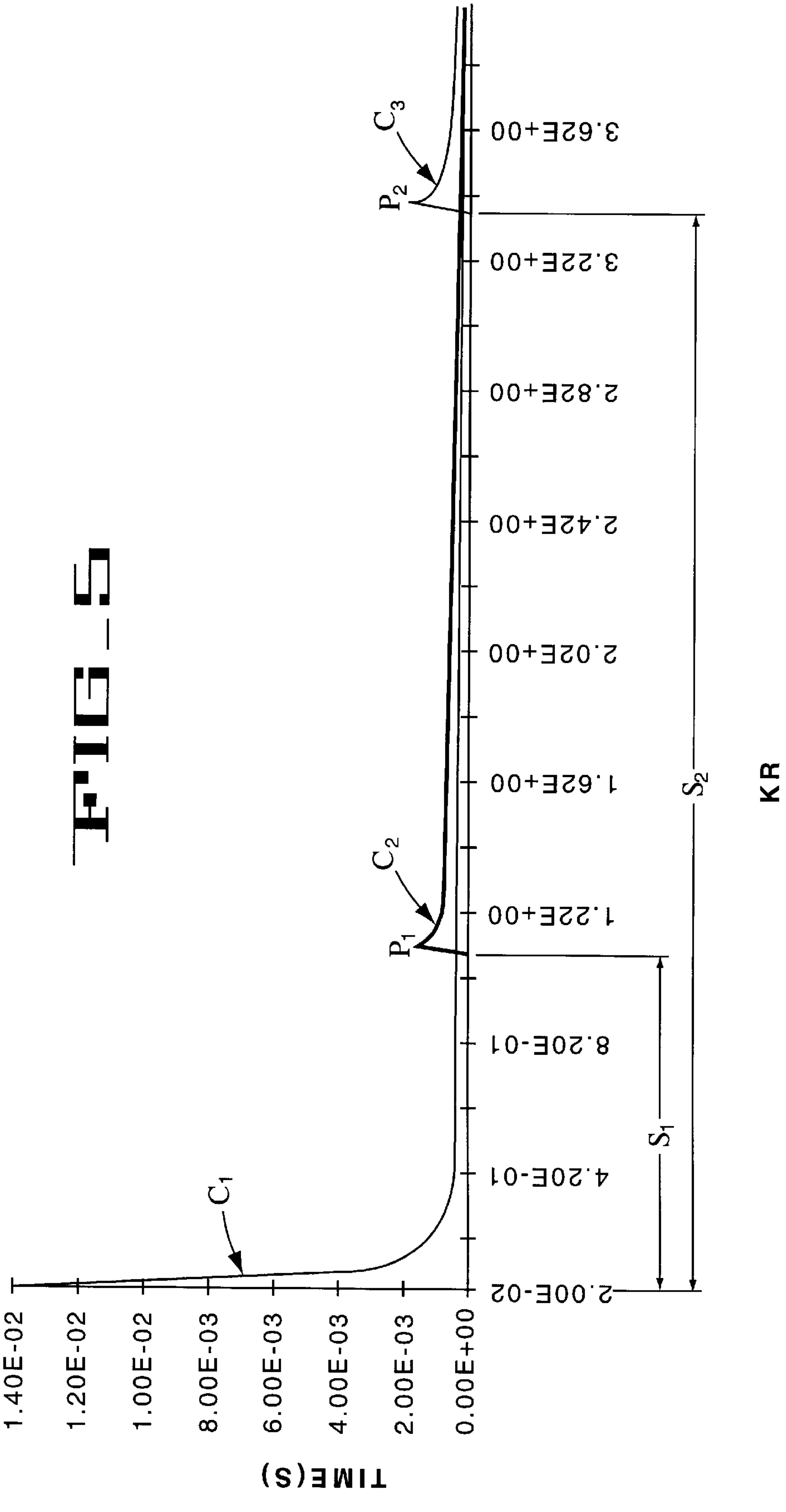
FIG. 5 is an instability growth time curve for a 0.3175 cm diameter aluminum arc with a current of 100 kA and an external magnetic field of 7.5 kG.

FIG. 5 is an instability growth curve. It shows time versus KR where K is defined by the ratio $2\pi/\lambda$. R is the radius of the arc. $\lambda$ is the dominant wave length of the arc for which the radius R is fixed. The graph shows an instability growth time for 0.3175 cm diameter aluminum arc with a current of 100 KA and a magnetic field of 7.5 kG. $C_1$ is a curve for a regular fuse with no winding or helical structure generating a plasma arc with a cylindrical jet topology. $C_2$ is a curve for a helical fuse with plasma having a single helix topology. $C_3$ is a curve for a helical fuse generating a plasma arc with a double (breaded) helix topology.

Figure 6:
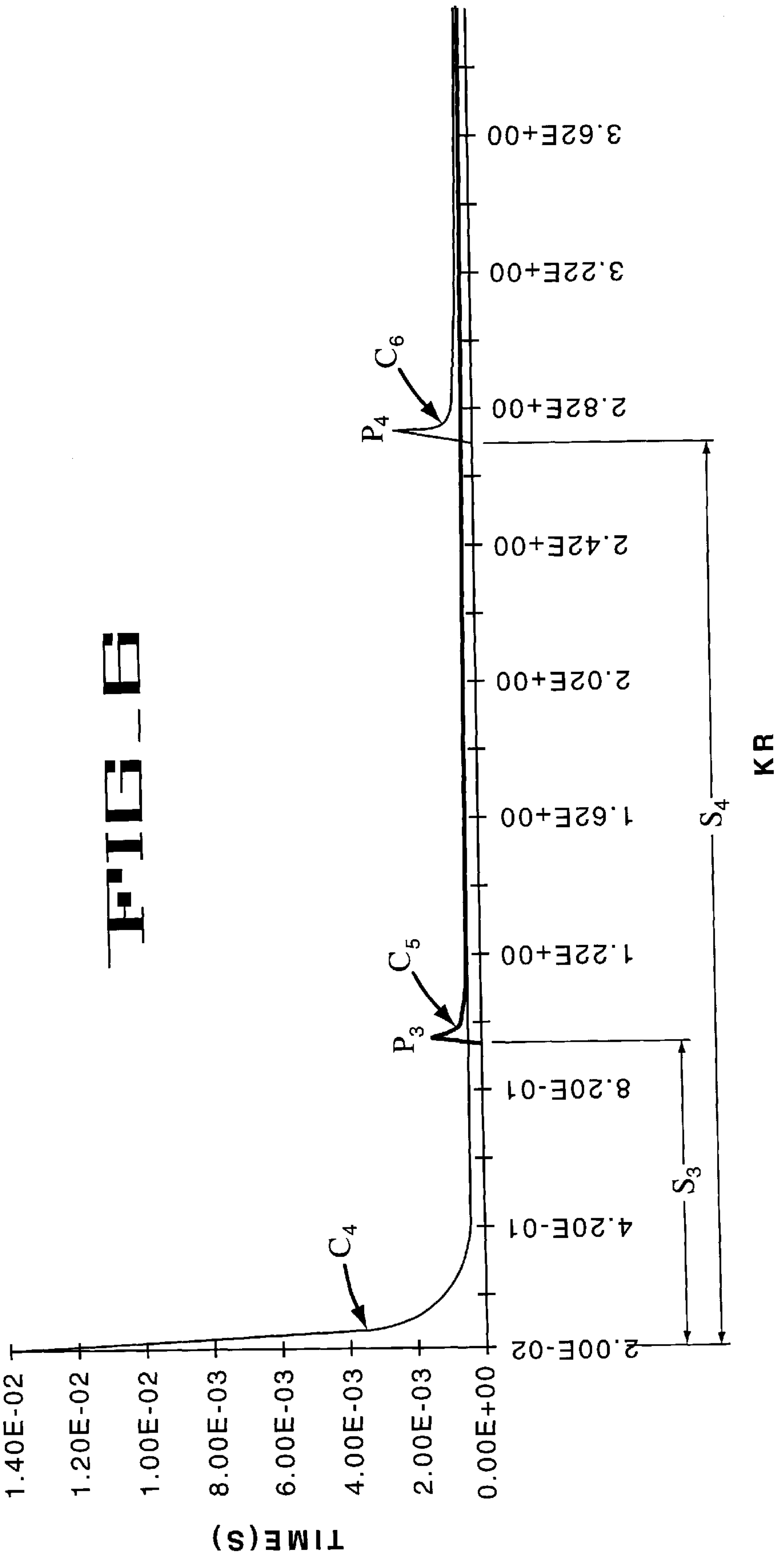
FIG. 6 is an instability growth time curve for a 0.3175 cm diameter aluminum arc with a current of 100 kA in an external electromagnetic field of 15 kG.

FIG. 6 is an instability growth curve. It shows time versus KR where K is defined by the ratio $2\pi/\lambda$. R is the radius of the arc. $\lambda$ is the dominant wave length of the arc for which the radius R is fixed. The graph shows an instability growth time for 0.3175 cm diameter aluminum arc for which the radius R is fixed. The graph shows an instability growth time for a 0.3175 cm diameter aluminum arc carrying a current of 100 kA and an external magnetic field of 15 kG. $C_1$ is a curve for a regular fuse which yields plasma having a cylindrical jet topology. $C_2$ is a curve for a helical fuse with a plasma arc having a single helix topology. $C_3$ is a curve for a helical fuse having a double (breaded) helix topology.

The disclosure herein above pertains to the significant structural elements of the present invention. A functionality disclosure relative to the best mode is discussed herein below.

As disclosed in FIG. 1, power is supplied from power supply source 24. Power connection at rim insulator 14 provides power contact to helical conductor 28 and anode 30. Electric current travels down helical conductor 28 and resides in anode 30. Anode 30 is cup shaped providing internal and external contacts. Helical conductor 28 is installed inside the hollow of the cup of anode 30. Further, helical conductor 32 is connected to the external surface of anode 30 and forms a current return path which guides current to cathode 26 at the opposite end. Hereafter the current flows through stub case 12 and is directed to ground 33. Helical conductor 28 is rotatably installed in grooves "G" of mandrel 37. Conductor 28 is secured in grooves "G" to provide structural integrity. Further, assuming that helical conductor 28 is the fusing material, as electromagnetic forces build on helical conductor 28 during the generation of plasma arc mandrel 37 supports helical conductor 28 from deforming under the electromagnetic force field. Moreover, mandrel 37 enables helical conductor 28 to retain its helical shape as it vaporizes under the input of electrical energy from power supply 24.

Helical conductor 32 is coated with dielectric insulation coating 39. The insulation coating 39 is designed to isolate helical conductor 32 from the surrounding combustible mass 42 as well as prevent shorting of the arc as helical conductor 28 is evaporated to form the plasma arc. Insulation coating 39 is applied to helical conductor 32 using many of the well-known techniques of coating such as spraying or dipping conductor 32 in a solution of insulation coating 39.

Either one of helical conductors 28 and 32 could be used as fuse. If helical conductor 28 is the fusing material then current will flow in from power supply 24 until helical conductor 28 evaporates and becomes a plasma arc. The evaporated conductor 28 will form a plasma arc with a single helix profile congruent with grooves "G" of mandrel 37. Grooves "G" provide a formation locus for the plasma arc and provide axial symmetry to the plasma arc. More significantly, mandrel 37 provides circumferencial and axial support to the plasma arc such that the common problems of plasma arc kinking, sausaging, collapsing and random swirling are eliminated. Helical conductor 32 will conduct the return current from cathode 26 to anode 30 and produce on the centerline an electromagnetic field which is substantially axially oriented. The magnitude of the electromagnetic field will be determined by the number of turns per unit length of helical conductor 32 as well as the axial electromagnetic field produced by the plasma arc of helical conductor 28. The magnitude of the axial electromagnetic field on the center-line can be selected by design so as to stabilize the plasma arc at the center.

Typically, when helical conductor 28 is the fuse material, the outer electromagnetic field envelopes the plasma and confines it until a mature and consistent plasma arc is formed. As the plasma arc develops it advances radially outward and pushes against the surrounding electromagnetic field. The electromagnetic field reactively pushes against the plasma arc. Consequently, the interaction between these two opposing forces results in an equilibrium wherein the plasma is radially extended within the surrounding electromagnetic field, which acts as a stabilizer and plasma container. The magnitude of the electromagnetic force can be fine-tuned by adjusting the relative number of turns between the outer helical conductor 32 and the inner helical conductor 28 to limit the radial extension of the plasma arc for a given electrical current "I". In the preferred embodiment mandrel 37 is generally ablated and provides further combustive fuel as the plasma proceeds to invade the surrounding combustible mass 42. In the alternate, mandrel 37 may be made from a non-consumable material and will remain intact.

The resultant electromagnetic force can be adjusted and varied by changing the relative number of windings between helical conductors 28 and 32. Further, by matching a counter clockwise helicity with a clockwise helicity such that the direction of helicity of one conductor is opposite that of the other, different magnitudes of electromagnetic force field may be generated. This will have significant influence on the formation of the plasma arc and its reach of radial extension into combustible mass 42.

Referring to FIG. 3, similar helical windings of the inner and outer helix complement each other relative to the current and the resultant electromagnetic field vectors. Thus at the center-line the electromagnetic field vectors $B_{in}$ and $B_{out}$ are additive. On the other hand the electromagnetic field vectors between helical conductors 28 and 32, $B_{in}$ and $B_{out}$, are in opposing directions in the force field formed between the helical conductors and are therefore deductive.

In the alternate, with reference to FIG. 4 if dissimilar helical windings are used the inner electromagnetic fields $B_{in}$ and $B_{out}$ are in opposing directions and are deductive. However, the electromagnetic fields between the two helical conductors are additive—i.e. $B_{in}$ and $B_{out}$ are in the same direction. This is a typical situation in which pinch plasma may result because of the resultant high electromagnetic force surrounding the plasma arc. Since the plasma is exposed to a net electromagnetic force, sausaging and or interruptions of the plasma are expected. However, as discussed herein above, mandrel 37 enables the plasma arc to retain its helicity as well as continuity. Mandrel 37 also prevents the formation of pinch and sausaging because it forms a barrier between consecutive and contiguous helical sections of the plasma arc. Further the net electromagnetic field will limit the radial extension and distortion of the plasma arc. The net electromagnetic field at the coaxial center could be reduced by adjusting the relative number of turns between the outer helical conductor 32 and the inner helical conductor 28.

If helical conductor 32 is used to produce the plasma arc the radius of the plasma thus produced will tend to increase causing the plasma arc to sweep through an increasing volume of combustible material. The plasma arc generated with this type of structural arrangement may result in uncontrollable burning because of the expansive tendency of the plasma arc. However, adjusting the number of relative windings between the coaxial helical conductors 28 and 32 enables control of the formation and Specifically, structural variations in the helicity of conductors 28 and 32, i.e. making the helicity of one conductor counterclockwise relative to the helicity of the other, may be used to control the expansivity of the plasma arc. It should be noted that when helical conductor 32 is used as the fuse material, insulation coating is designed to be ablatable thus providing fuel to the system. The electromagnetic environment can be controlled and managed to limit the expansivity of the plasma arc into combustible mass 42 by decreasing the electromagnetic field around helical conductor 28. Thus, the plasma arc develops and radiates outward when helical conductor 32 evaporates and is further pushed outward by the electromagnetic force from the helical conductor 28. This results in a forced embedment and infusion of plasma into combustible mass 42. Controlling the electromagnetic force at helical conductor 28 is therefore important in controlling the expansion and diffusion rate of the plasma arc into combustible mass 42.

As indicated herein above, the magnitude of the net electromagnetic field acting on a plasma arc is critical in the development, consistency, sustainability and symmetry of the plasma arc. Referring to FIGS. 5 & 6, the effects of an electromagnetic field on arc symmetry and development are indicated. FIG. 5 provides an instability growth for aluminum arc with 0.3175 cm diameter and a current of 100 KA. The net electromagnetic field is a magnitude of 7.5 KG.

The graph indicates a zero instability growth for small values of kR, where R=0.3175/2 cm and $k=2\pi/\lambda$ wherein $\lambda$ is the wave length of the predominant arc. Small values of kR relate to large values of $\lambda$. $C_1$ is an arc instability curve for a regular fuse with no winding. The plasma arc in such a fuse has generally a cylindrical jet topology. Curve $C_1$ indicates that the plasma arc is never stable for this type of plasma. In sharp contrast, if a helical fuse wire were used the arc will be stable for the KR value segment $S_1$. Similarly, $C_2$ indicates the instability curve for a helical fuse with a plasma having a single helical topology. The curve starts at $P_1$. $P_1$ indicates a time and KR value at which the plasma arc of a helical fuse such as helical conductors 28 and 32 starts its instability. $C_3$ is an instability curve for a helical fuse wherein the plasma arc is a double(breaded) helical topology. This type of plasma arc is stable for segments of KR values $S_2$. $P_2$ indicates a time and KR values at which the double plasma arc starts to become unstable. Accordingly, for a helical fuse and helical plasma arc symmetries having long wave lengths, the resultant plasma arc is stable.

Further, the graphs in FIGS. 5 and 6 clearly show that a fuse with no winding, such as a single filament having a cylindrical profile, yields the most unstable plasma arc compared to fuses which utilize helical or similar structures.

Similarly, FIG. 6 indicates a graph for instability growth time. The external magnetic field is 15 kG and all the other parameters are identical to FIG. 5. Comparing FIGS. 5 and 6, therefore, it is clear that an increase in the net electromagnetic force will shift the locations of the instability points to new positions $P_3$ and $P_4$. The shift is in the direction of increasing wave length. In other words, when the net electromagnetic field is increased, all other parameters being equal, a high frequency of instability growth is anticipated. In other words, $S_3$ is shorter than $S_1$ and $S_4$ is shorter than $S_2$. Accordingly, an increase in electromagnetic forces will disrupt the stability of a given plasma arc. Hence, for a given wave length there is an optimal complementary net electromagnetic field beyond which the plasma arc symmetry is unstable. As discussed herein above, the present invention enables creating the desired and optimal net electromagnetic force by adopting several of the parameters of the helical coil conductors 28 and 32. Further, the present invention enables the use of high energy supplies which yield stable plasma and high temperature and pressure which translate into higher muzzle velocity for projectile 16.

The present invention operates in conjunction with a cartridge 10 in which combustible mass 42 is contained. With reference to the preferred embodiment of FIG. 1 assuming coil 28 to be the fuse, electrical current travels to anode 30. It follows a return path via outer helical conductor or coil 32 and the current is directed to cathode 26. As indicated herein above, if the windings of the coaxial helical conductors or coils 28 and 32 are similar the net electromagnetic force will be the resultant of the vectors shown in FIG. 3. In the alternate, if the windings of the coaxial helical conductors or coils is dissimilar, the net electromagnetic force will be the resultant of the vectors shown in FIG. 4. Therefore, varying the windings will enable manipulation of the arc symmetry of the plasma. Further, by varying the plasma source, i.e. using the outer helical conductor 32 as the plasma source and the inner coil 28 as the current return path the configuration of the plasma could be changed.

An alternate embodiment of the present invention is shown in FIG. 2. Helical conductors 28' and 32' are conically shaped to accommodate the sabot and fins of projectile 16. The assembly is shown in gun chamber 52 with the projectile engaged in gun tube 54. Except for the conical shape of the conductors, the systems operate similar to the embodiment of FIG. 1. Either conductor 28' or 32' is used as a fuse with the other being the carrier for the return current and also the contributor to the net electromagnetic force. Mandrel 37' comprises of grooves "G" similar to mandrel 37.

As indicated in the best mode embodiments disclosed herein above, the stabilization of plasma yields consistent arcs and enhances energy coupling between the plasma and the combustible mass. This promotes improved ignition and combustion resulting in higher pressure and temperature yield per unit weight of combustible mass. Particularly, the use of an adjustable electromagnetic force environment to influence and shape the plasma arc is one of the unique aspects of the present invention.

While the preferred embodiments of the stabilized plasma arc have been shown and described, it will be appreciated that various changes and modifications may be made therein without departing from the spirit of the invention as defined by the scope of the appended claims.

What is claimed is:

1. A method of stabilizing a plasma arc to provide sustainable plasma to ignite a combustible mass contained in a cartridge structure to accelerate a projectile comprising:

forming an adjustable electromagnetic field;

enclosing the plasma in the electromagnetic field; and adjusting said electromagnetic field to create a stable formation and provide axial consistency to the plasma.

2. The method according to claim 1 wherein said electromagnetic field is enclosed by the plasma.

3. A structure to generate a stable plasma arc using electromagnetic stabilizing forces comprising:

a plurality of elongate, concentrically disposed shaped-coils having end connections and a current path therebetween; and means for conducting power to at least one of said plurality of shaped coils to thereby conduct sufficient power to evaporate said at least one shaped coil to generate the plasma;

said plasma being in one of internal and external contact with one of said coils to thereby form said electromagnetic stabilizing forces to shape and form the plasma.

4. The structure of claim 3 wherein one of said at least one shaped coil being evaporated includes a mandrel on which said evaporated coil is supported.

5. The structure of claim 3 wherein said shaped-coils include helical coils having isometrically identical windings.

6. The structure of claim 3 wherein said shaped-coils include co-axial windings structured to generate net electromagnetic forces which are one of an additive and deductive vectors.

7. A structure to contain, incubate, direct and provide axial consistency to a plasma using electromagnetic forces generated by evaporating one of a plurality of concentrically disposed helical conductors while the other conductor is used to shape the plasma comprising:

means for delivering electrical energy sufficient to evaporate one of said helical conductors;

means for providing a current path between said helical conductors;

means for varying the electromagnetic force to manipulate and shape the plasma arc; and a dynamic means for maintaining a current path between one of said helical conductors being evaporated, said means for delivering energy and said means for varying the electromagnetic force.

8. The structure of claim 7 wherein said means for varying the electromagnetic force includes a geometric variance of a relative helicity between windings of said helical conductors.

9. The structure of claim 8 wherein said geometric variance includes dissimilar windings between said concentrically disposed helical conductors.

10. The structure of claim 8 wherein said geometric variance includes opposing directions of windings in said concentrically disposed helical conductors.

11. The structure according to claim 7 wherein said dynamic means for maintaining a current path includes a plasma arc which is stabilized and forms an electric current path between said evaporated helical conductor and said other conductor.

12. The structure according to claim 7 wherein said helical conductors include a conical shape.

* * * * *